Dec. 30, 1952  M. H. HOWARD  2,623,618
VALVE CONTROL
Filed Aug. 23, 1946  3 Sheets-Sheet 1
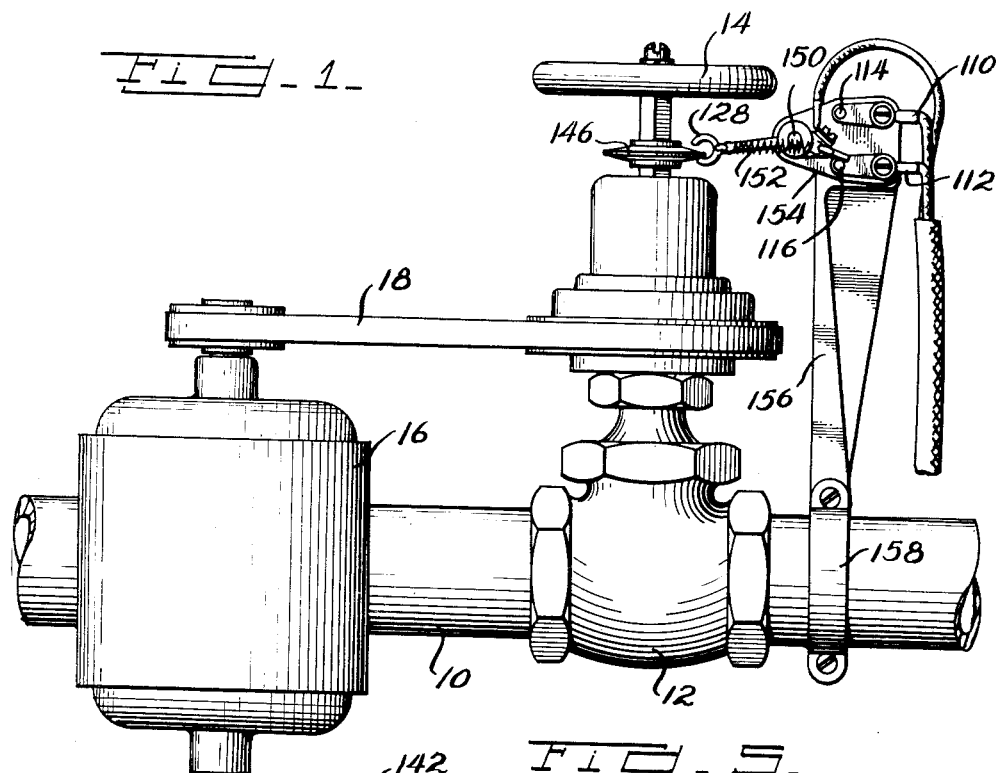
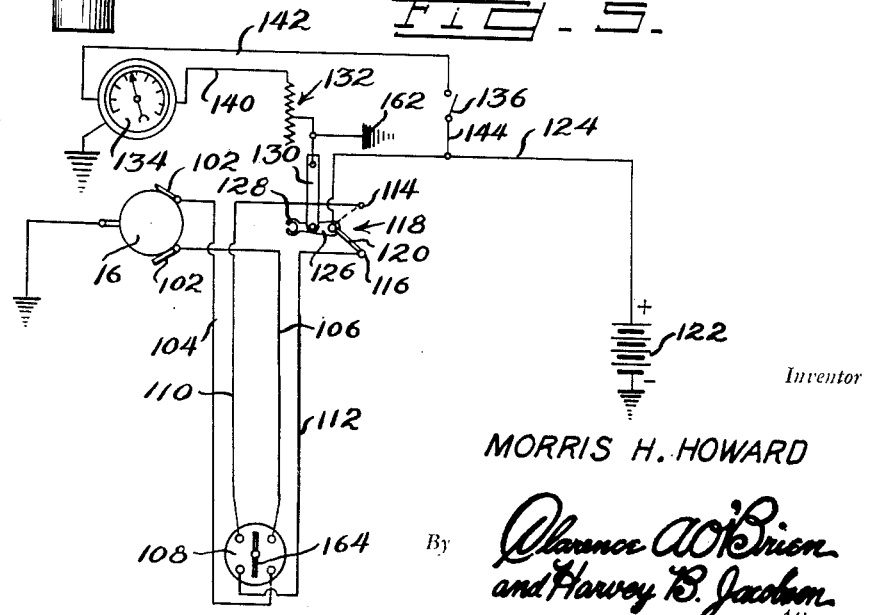
Inventor
MORRIS H. HOWARD
By Clarence A. O'Brien
and Harvey B. Jacobson
Attorneys

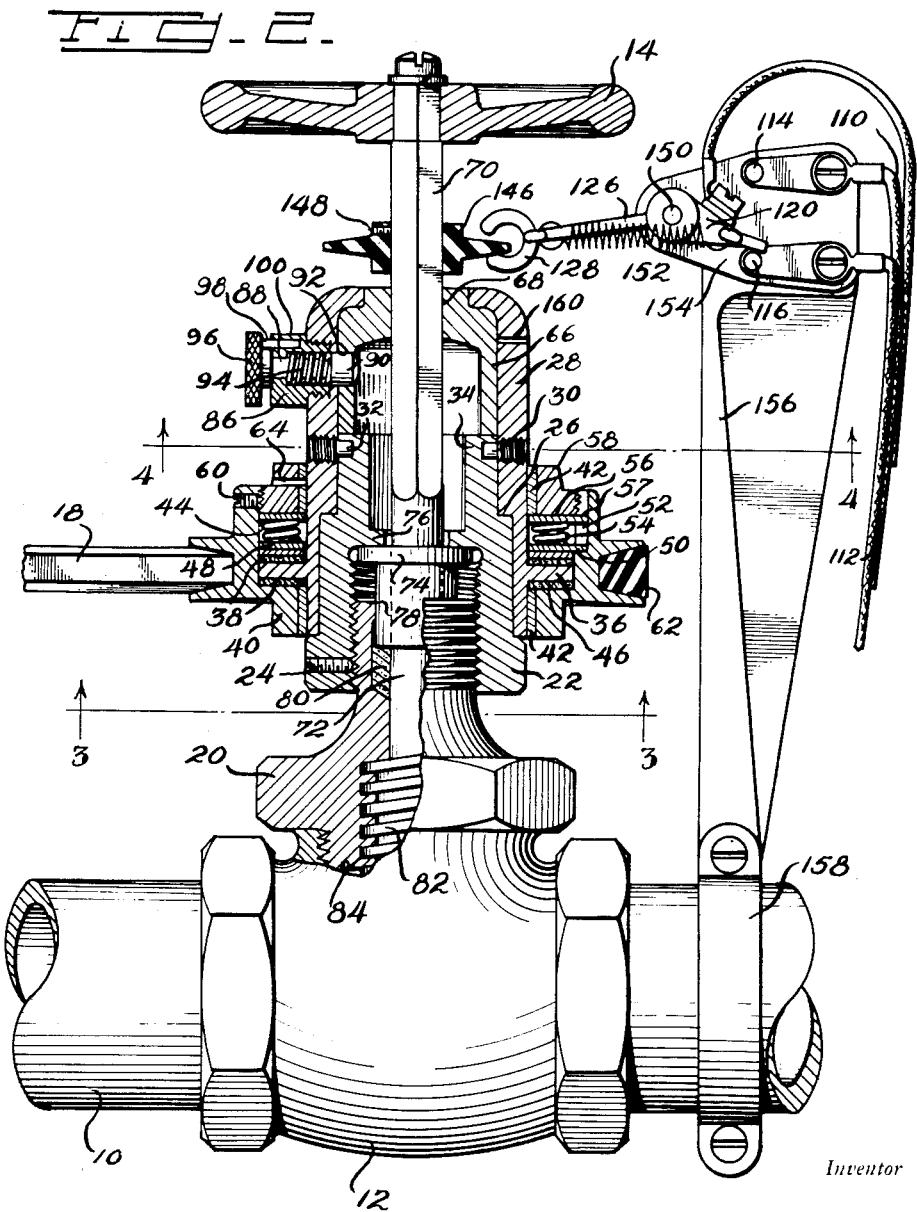

Dec. 30, 1952 M. H. HOWARD 2,623,618
VALVE CONTROL
Filed Aug. 23, 1946 3 Sheets-Sheet 3
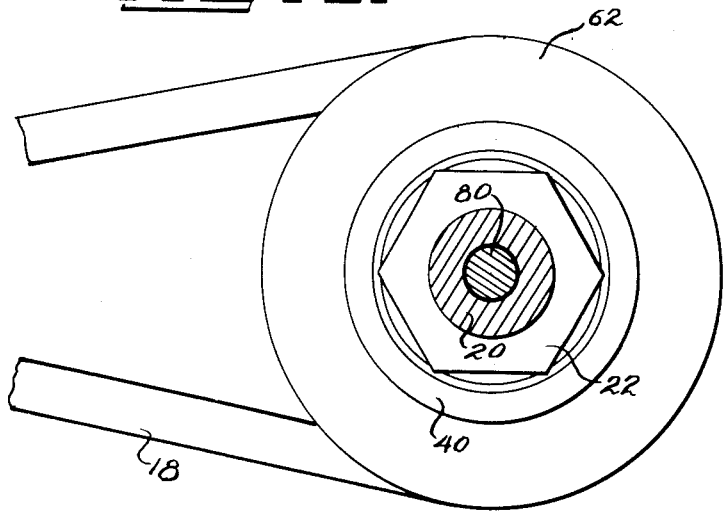
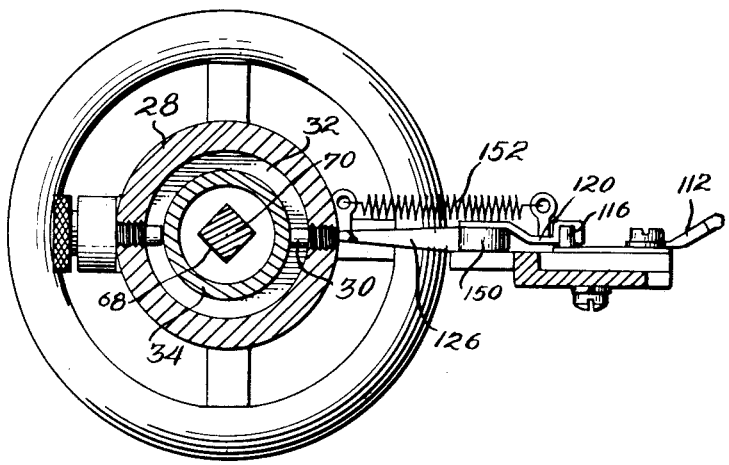
Inventor
MORRIS H. HOWARD
By Clarence A. O'Brien
and Harvey B. Jacobson
Attorneys Patented Dec. 30, 1952

2,623,618

UNITED STATES PATENT OFFICE 2,623,618

VALVE CONTROL

Morris H. Howard, Osburn, Idaho

Application August 23, 1946, Serial No. 692,467

10 Claims. (Cl. 192—48)

1

The present invention has reference to a novel valve control and more especially pertains to a remote control means for attachment to a conventional valve for operating the same.

The principal objects of the invention are to provide a device for controlling by automatic means the operation of a line valve by remote control; which device is adapted for attachment to conventional line valves with a minimum of alteration thereof; which may be installed thereon without necessitating the removal of the line valve from its assembly; which incorporates therein safety features preventing damage to the valve or the actuating means; which automatically causes deenergization of the actuating means when the valve has been moved to a predetermined open or closed position; and which permits the manual operation of the valve when desired.

These, together with various ancillary objects of the invention, which will later become apparent as the following description proceeds, are realized by my invention, one embodiment of which has been illustrated by way of example only in the accompanying drawings wherein:

Figure 1 is an elevational view of an assembly including my invention;

Figure 2 is a vertical sectional view through the valve actuating means, parts being shown in elevation;

Figure 3 is a horizontal sectional view, taken substantially in line 3—3 of Figure 2;

Figure 4 is a horizontal sectional view, taken substantially in line 4—4 of Figure 2; and Figure 5 is a diagrammatic view of the electrical wiring system of the device.

Referring now more specifically to the attached drawings, wherein like numerals designate similar parts throughout the various views, 10 denotes a fluid line having a control valve 12 therein, provided with a hand wheel operating means 14. A suitably located reversible electric motor 16 operates by a pulley and V-belt 18, or any other suitable drive means, my improved control means for the valve 12.

As shown best in Figure 2, the valve 12 which is of conventional type has its usual valve stem, valve and packing nut replaced by my improved mechanism. This change can readily be made without removing the valve from the line 10 and by merely removing the customary valve packing nut. In accordance with my invention, a packing nut 22 is secured by the usual screw threads upon a bonnet 20 threaded into the valve body 12 in place of the customary packing nut and is retained by means of a set screw 24 or the like.

2

The packing or stuffing nut 22 is externally shouldered at 26 and rotatably receives and journals a rotary housing 28, which is retained by means of set screws 30 extending therethrough and loosely engaging an annular groove 32 (see Figure 4) upon an extending sleeve 34 of the nut 22. The lower end of housing 28 has a horizontal or laterally extending flange which forms a coupling plate 36 having non-metallic frictional linings 38 upon opposite sides thereof. A female coupling member 40 is journaled by means of sleeves 42 upon the housing 28, and has an annular chamber 44 receiving the coupling plate 36, a lower shoulder 46 providing a clutch surface engaging the lower lining 38. A coupling pressure plate 48 is loosely received in the chamber 44 and rests upon the upper surface of the upper lining 38, and has an extension 50 received in a keyway 52 of the chamber 44 to cause plate 48 to rotate with the coupling member 40. A plurality of clutch springs 54 are interposed between the pressure plate 48 and a washer 56 which may have a radial extension 57 engaging keyway 52, the springs being adjusted by means of a gland or nut 58 which is screw threaded into the chamber 44 and retained in adjusted position by a set screw 60. A pulley 62 is formed upon the circumference of coupling member 40 and receives the V-belt 18 or other drive mentioned above. Suitable oil holes 64 are provided for supplying lubricant to the coupling members.

From the foregoing, it will be perceived that actuation of motor 16 and belt 18 will produce rotation of the coupling member 40. By means of the engaging friction surfaces 48 and 46 of the female member and the male coupling plate 36 and the linings 38, the housing 28 is caused to rotate for a purpose to be later set forth. The adjusting nut 58 permits regulation of the springs 54 and consequently of the clutch action, it being understood that excessive torque between members 40 and 36 will effect slippage of the coupling elements thereby preventing damage to the motor or the associated parts of the device.

Within the upper end of housing 28 is rotatably mounted a valve stem drive sleeve 66 having an axial squared aperture 68 through which extends the squared extremity 70 of a valve stem 72, having the hand wheel 14 at its upper end. The bonnet 20 is provided with a recess and the customary valve stem packing 80, and is threaded as at 82 for engagement with the valve seat threads 84. An oil hole 160 is provided for lubricating the housing 28 and sleeve 66.

A manual latching means is adapted to releaseably secure housing 28 to the drive sleeve 66 and consists of a bushing 86 screw threaded with housing 28 and bored to receive a latch pin 88 whose headed end 90 selectively engages aperture 92 in the driving sleeve 66. A spring 94 surrounds the pin 88 and biases the head 90 towards the sleeve 66, while a knurled pull knob 96 permits retraction of the latch pin. A rod 98 upon the knob 96 is engageable in a bore 100 in the bushing 86. When the knob 96 is pulled, the latch pin 88 and rod 98 are retracted, disengaging the latch head 90 from the aperture 92 in sleeve 66, and the rod 98 is engaged upon the surface of bushing 86 to hold the head 90 in inoperative position.

From the foregoing, it will be understood that when the latch pin 88 is disengaged, the driving connection between housing 28, coupling member 40 and motor 16 and the sleeve 66 and valve stem 70 is broken, and the valve head, not shown, may be adjusted relative to its seat, not shown, by manipulation of hand wheel 14; when the latch pin 88 is engaged, the valve stem 70 is connected for manipulation by the motor and clutch as set forth hereinbefore.

It is intended that the valve stem 70 shall be rotated to opened or closed position by means of the reversible motor 16, through an electrical remote control system of any suitable type such as that shown in Figure 5. The reversible motor 16 has its brushes 102 connected by conductors 104 and 106 with a reversing switch 108 having a manually operable blade 164. A second pair of leads 110 and 112 are connected to switch 108 and engage terminals 114 and 116 respectively of the limiter switch 118. The snap-action blade 120 of the switch 118 is in contact at one end with either of terminals 114 and 116 while the other end is in contact series with battery or other source of current, 122 by means of lead 124. An actuating arm 126 is connected to the snap-action switch blade 120, and is bifurcated at 128 for engagement and synchronized movement by the valve stem 72. A connecting arm 130 is pivoted to the actuating arm 126 and operates a rheostat 132, grounded at 162 and which is in series with a gauge or indicator 134 and the battery 122 by means of manual switch 136 and cables 140, 142 and 144.

Reference is again made to Figures 1 and 2, wherein it may be seen that the yoke or bifurcated end 128 of the actuating arm 126 is caused to straddle or embrace a limiting or stop disk 146 which is axially adjustable upon valve stem 70 by means of a set screw 148. The arm 126 and blade 120 are pivoted upon a common pin 150 and are biased together in angular relation by a spring 152, the members 126, 120, 150 and 152 forming a conventional type of snap action mechanism. The snap-action switch is carried by a plate 154 secured to a bracket 156 fastened to the pipe 10 as by a clamp 158.

The operation of the foregoing electric control mechanism is as follows when the switch 136 is closed an indicating circuit is energized to show at all times the position of the valve head to the valve seat by means of the axial displacement of the valve stem 70 and the adjustable stop 146. This circuit consists of the battery 122, the leads 124, 144, switch 136, lead 142, gauge or indicator 134, lead 140 rheostat 132 and the ground 162. It will be understood that as the disk 146 is moved axially with the valve stem 70, the actuating arm 126, the link 130 and the rheostat 132 are correspondingly actuated to vary the strength of current supplied to the motor 134. The latter is calibrated to the varying strength of the rheostat controlled current and indicates directly the amount of valve opening.

The remote control switch 108 is preferably mounted in conjunction with the indicator 134 upon a suitable control panel remotely positioned relative to the motor 16. Switch 108 has its blade 164 movable from a neutral or inoperative position, shown in Figure 5, in either a clockwise or counter-clockwise direction for connecting alternate sets of contacts. With the parts in the position shown in Figure 5 the valve and consequently the valve stem stop 146 will be at the valve closed position. Let us assume that the switch is now rotated clockwise. The leads 112 and 106 will now be connected and the electric current will flow from its source 122 to the motor 16 causing rotation in one direction and effect movement of the valve stem 70, valve control means 146 and the valve head in an opening movement. As the valve opens, its stem 70 and the control disk 146 move axially causing pivotal movement of actuating arm 126. The indicating circuit and mechanism as above set forth indicate this movement. When the valve has reached its desired travel the disk 146, which may be axially adjusted upon the valve stem 70 for this purpose, trips the snap-action arm 126 and blade 120 and breaks the circuit through lead 124, arm 120 and contact 116, thereby deenergizing the motor 16, with the blade 120 now resting on terminal 114. Terminal 114 however is not in a complete circuit, since switch blade 164 does not connect leads 110 and 104. When it is desired to close the valve, blade 164 is rotated into its counter-clockwise position, connecting leads 104 and 110 and as blade 120 is now engaging contact 114, the motor 16 is caused to rotate in the reverse direction, and closes the valve. The contact disk 146 now functions as before, but in the reverse direction, until the snap-action of switch 118 causes blade 120 to return to contact 116 again stopping the motor.

From the foregoing it will be seen that I have provided a remote control switch for initiating movement of the motor which moves the valve to a predetermined extreme of travel and is automatically cut off when that extreme is reversed. Simultaneously an electric indicating means at all times indicates the position of the valves.

What I claim as my invention is:

1. In a power operated valve provided with a support, a driven member rotatably journaled on said support, power means actuating said driven member, means preventing longitudinal movement of said driven member relative to said support, a further driven member rotatably carried by said first driven member, means detachably securing said driven members to each other for simultaneous rotation, a shaft having a multi-sided shank portion, said further driven member having a multi-sided opening receiving the shank portion for rotation of said shaft with said further driven member, said power means including a pulley rotatably mounted on said first mentioned driven member, an endless connection between said pulley and the driving shaft of a motor, and an overriding coupling drivingly interconnecting said pulley and said first mentioned driven member.

2. A power operated valve provided with a support, a first driven member rotatably journaled on said support, means for preventing axial movement of said first driven member relative to its support, a second driven member rotatably journaled on said first driven member, coupling means drivingly securing together said first and second driven members for simultaneous rotation, a third driven member rotatably journaled within said first driven member, a valve shaft extending upwardly through said third driven member, said valve shaft having a multi-sided shank portion closely engaging within a multi-sided opening in said third driven member, means detachably securing said third driven member to said first driven member.

3. The valve of claim 2 wherein said second driven member includes a pulley operatively connected to a power source.

4. A power operated valve provided with a support, a first driven member rotatably journaled on said support, means for preventing axial movement of said first driven member relative to its support, a second driven member rotatably journaled on said first driven member, coupling means drivingly securing together said first and second driven members for simultaneous rotation, a third driven member rotatably journaled within said first driven member, a valve shaft extending upwardly through said third driven member, said valve shaft having a multi-sided shank portion closely engaging within a multi-sided opening in said third driven member, means detachably securing said third driven member to said first driven member, said means detachably securing together said first and third driven members including latch means.

5. The valve of claim 2 wherein said coupling means drivingly securing together said first and second driven member includes an overriding coupling mechanism.

6. The valve of claim 4 wherein said latch means includes a bushing removably secured to said first driven member having a bore therethrough, an aperture in said third driven member adjacent said bushing, a latch pin retractably positioned in said bore and said aperture, and resilient means in said bushing normally urging one extremity of said latch pin into engagement with said aperture.

7. The combination of claim 6 and a further bore in said bushing, a knob at the other extremity of said latch pin, and a transversely extending rod carried by said knob and slidably retained in said further bore.

8. The valve of claim 2 wherein said means preventing longitudinal movement of said first-mentioned driven member includes circumferentially spaced lugs projecting from the inner periphery of said first-mentioned driven member, and said support having an annular groove receiving said lugs.

9. The combination of claim 8 wherein said means detachably securing said first and third driven members includes latch means.

10. The combination of claim 9 wherein said latch means includes a bushing removably secured to said first-mentioned driven member having a bore therethrough, an aperture in said further driven member adjacent said bushing, a latch pin retractably positioned in said bore and said aperture, and resilient means in said bushing normally urging one extremity of said latch pin into engagement with said aperture.

MORRIS H. HOWARD.

REFERENCES CITED

The following references are of record in the file of this patent:

UNITED STATES PATENTS

| Number | Name | Date |
|---|---|---|
| Re. 9,823 | Fish | July 26, 1881 |
| 322,423 | Corey | July 21, 1885 |
| 1,508,138 | Foote | Sept. 9, 1924 |
| 1,587,869 | Smith | June 8, 1926 |
| 1,681,487 | Lee | Aug. 21, 1928 |
| 1,764,936 | Dean | June 17, 1930 |
| 1,904,375 | Kind | Apr. 18, 1933 |
| 1,908,763 | Kelty | May 16, 1933 |
| 2,005,891 | Elberty | June 25, 1935 |
| 2,109,767 | Cook | Mar. 1, 1938 |
| 2,114,013 | Ball | Apr. 12, 1938 |
| 2,435,440 | Graham | Feb. 3, 1948 |